(12) United States Patent
McTaggart et al.

(10) Patent No.: US 6,510,942 B2
(45) Date of Patent: Jan. 28, 2003

(54) MODULAR ROLLER CONVEYOR SYSTEM

(75) Inventors: Michael Douglas McTaggart, Windsor (CA); Andrew Noestheden, Tecumseh (CA)

(73) Assignee: Valiant Corporation (CA)

( * ) Notice: Subject to any disclaimer, the term of this patent is extended or adjusted under 35 U.S.C. 154(b) by 0 days.

(21) Appl. No.: 10/218,440

(22) Filed: Aug. 14, 2002

(65) Prior Publication Data

US 2003/0000812 A1 Jan. 2, 2003

Related U.S. Application Data

(63) Continuation of application No. 09/730,305, filed on Dec. 5, 2000.

(51) Int. Cl.[7] .............................................. B65G 21/00
(52) U.S. Cl. .................................. 198/861.1; 198/860.1
(58) Field of Search ......................... 198/861.1, 860.1, 198/788

(56) References Cited

U.S. PATENT DOCUMENTS

| | | | |
|---|---|---|---|
| 1,852,488 A | 4/1932 | Stewart et al. | 198/861.1 |
| RE21,349 E | 2/1940 | Jarrett | 198/861.1 |
| 3,263,951 A | 8/1966 | Stokes | 248/172 |
| 3,820,650 A | 6/1974 | Garvey | 198/861.1 |
| 4,146,126 A | 3/1979 | Mattos | 198/861.1 |
| 4,524,864 A | 6/1985 | Peterson, II | 198/861.1 |
| 4,930,623 A | 6/1990 | Johnson et al. | 198/465.1 |
| 4,951,809 A | 8/1990 | Boothe et al. | 198/841 |
| 5,078,250 A | 1/1992 | Cole | 198/861.1 |
| 5,186,313 A | 2/1993 | Denker et al. | 198/806 |
| 5,205,400 A | 4/1993 | Breuss et al. | 198/861.1 |
| 5,421,451 A | 6/1995 | Easton | 198/861.1 |
| 5,529,171 A | 6/1996 | Langenbeck | 198/861.1 |
| 5,657,854 A | 8/1997 | Chen et al. | 198/787 |
| 6,012,568 A | 1/2000 | Kane | 198/861.1 |

FOREIGN PATENT DOCUMENTS

| | | |
|---|---|---|
| DE | 197 41 663 A1 | 3/1999 |
| JP | 05 000713 A | 1/1993 |

*Primary Examiner*—Douglas Hess
(74) *Attorney, Agent, or Firm*—Gifford, Krass, Groh, Sprinkle, Anderson & Citkowski, P.C.

(57) ABSTRACT

A modular roller conveyor system is disclosed having a first and second pair of elongated vertical supports. The first pair of vertical supports are adjustably secured together so that the first pair of supports are spaced apart and parallel to each other at a user selected spacing between the first pair of vertical supports. Similarly, the second pair of vertical supports are also adjustably secured together so that the second pair of vertical supports are spaced apart and parallel to each other at the same user selected spacing. A first elongated rail is then secured to the upper end of one of the first pair of vertical supports and to the upper end of one of the second pair of vertical supports. A second rail is then secured to the upper end of the other of both the first and second pair of vertical supports so that the rails are spaced apart and parallel to each other. A plurality of spaced roller assemblies are then disposed between and supported by the rails thus forming the conveyor path along which articles are conveyed.

6 Claims, 4 Drawing Sheets

MODULAR ROLLER CONVEYOR SYSTEM

CROSS-REFERENCE TO RELATED APPLICATIONS

This application a continuation of U.S. patent application Ser. No. 09/730,305 filed Dec. 5, 2000.

BACKGROUND OF THE INVENTION

I. Field of the Invention

The present invention relates generally to conveyor systems and, more particularly, to a modular roller conveyor system.

II. Description of the Prior Art

There are many previously known roller conveyor systems of the type used in industrial manufacturing operations. These previously known roller conveyor systems typically comprise an elongated frame having a pair of spaced apart and parallel rails. A plurality of roller assemblies are then disposed across the rails and spaced apart from each other thus forming the conveyor path upon which articles to be conveyed are supported.

A primary disadvantage of this type of previously known industrial roller conveyor system is that each roller conveyor system has been custom designed and manufactured in dependence upon the particular type and size of article to be conveyed along the conveyor system. As such, the spacing between the rails or conveyor width, and thus the design of the conveyor frame, varies as a function of the size of the conveyed article.

While these previously known conveyor systems have proven satisfactory in operation, they are necessarily expensive to manufacture. This high cost of manufacturing such previously known roller conveyor systems results in large part from the necessity that each roller conveyor system must be custom designed in accordance with the load conveyed. Such custom design of these previously known roller conveyor systems necessarily entails increased engineering costs and highly skilled, and thus highly paid, assembly workers.

A still further disadvantage of these previously known roller conveyor systems is that, since each roller conveyor system is custom designed for a predetermined article, the roller conveyor system cannot be adapted for articles of different sizes, at least not articles of a larger size. This in turn results in premature obsolescence of the roller conveyor system when conveyance of the article for which the roller conveyor system was originally designed for is no longer required.

SUMMARY OF THE PRESENT INVENTION

The present invention provides a modular roller conveyor system which overcomes all of the above-mentioned disadvantages of the previously known devices.

In brief, the roller conveyor system of the present invention comprises a first pair of elongated vertical supports. These vertical supports are adjustably secured together so that the first pair of vertical supports are spaced apart and parallel to each other. However, unlike the previously known conveyor systems, the spacing between the first pair of vertical supports is adjustable to any selected user defined spacing.

Similarly, the conveyor system further comprises a second pair of elongated vertical supports. This second pair of elongated vertical supports is also adjustably secured together at the same user selected spacing as the first pair of vertical supports and so that the second pair of vertical supports are spaced apart and parallel to each other. The first pair of vertical supports and second pair of vertical supports are then positioned in a spaced apart relationship relative to each other.

A first elongated rail is then secured to an upper end of one of the first pair of vertical supports and to an upper end of one of the second pair of vertical supports. Similarly, a second elongated rail is secured to the upper end of the other of the first pair of the vertical supports and to the upper end of the other of the second pair of vertical supports so that the first and second rails are spaced apart and parallel to each other. A plurality of roller assemblies are then disposed between and supported by the rails so that the roller assemblies are spaced apart and parallel to each other. These roller assemblies thus define the path of the conveyor system and support the articles which are to be conveyed by the roller conveyor system.

Unlike the previously known roller conveyor systems, since the vertical supports in both the first pair of vertical supports and second pair of vertical supports are secured together at a user selected spacing, the width of the roller conveyor system can be easily varied to accommodate articles of different widths. Furthermore, the spacing between the rails may be easily modified at a subsequent date by merely adjusting the spacing between the first pair of vertical supports and second pair of vertical supports. In this event, relatively inexpensive replacement of the roller assemblies to accommodate the new conveyor width may be required.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENT OF THE PRESENT INVENTION

Figure 4:
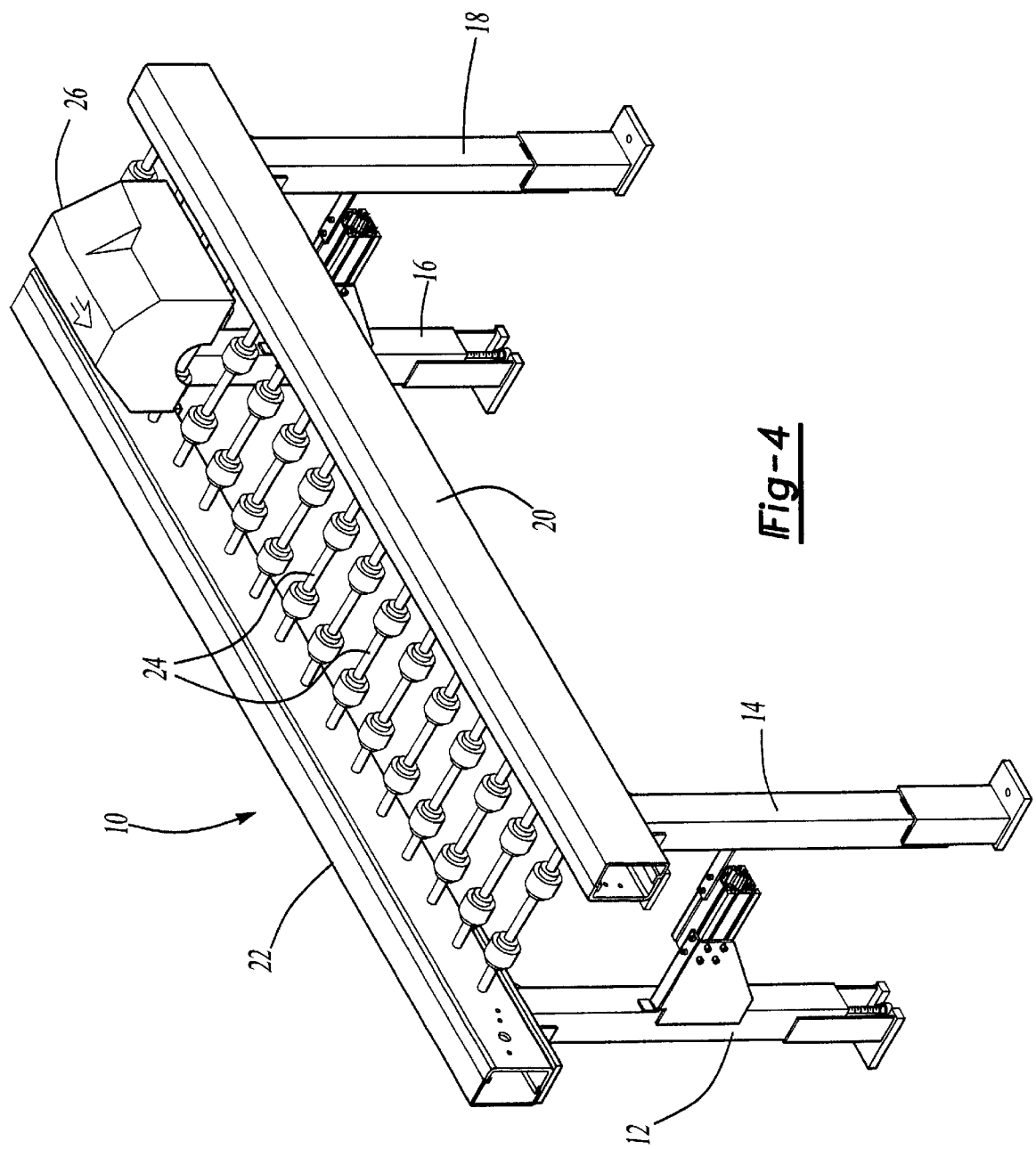
FIG. 4 is an elevational view of the preferred embodiment of the present invention.

With reference first to FIG. 4, a preferred embodiment of the roller conveyor system 10 of the present invention is there shown and comprises a first pair of elongated vertical supports 12 and 14 and a second pair of elongated vertical supports 16 and 18. The first pair of vertical supports 12 and 14 are spaced from the second pair of vertical supports 16 and 18.

A first elongated rail 20 is disposed along and supported by an upper end of the vertical supports 14 and 18. Similarly, a second elongated rail 22 is secured to and supported by an upper end of the other vertical supports 12 and 16 so that the rails 20 and 22 are spaced apart and parallel to each other. Preferably, the rails 20 and 22 are manufactured in preset modular lengths, such as ten foot or twelve foot lengths.

Still referring to FIG. 4, a plurality of roller assemblies 24 are disposed between and supported by the rails 20 and 22 so that the roller assemblies 24 are spaced apart and parallel to each other. These roller assemblies 24, furthermore, define the conveyor path for the conveyor system 10 and are adapted to support a bottom of a load 26 conveyed by the conveyor system 10.

Figure 1:
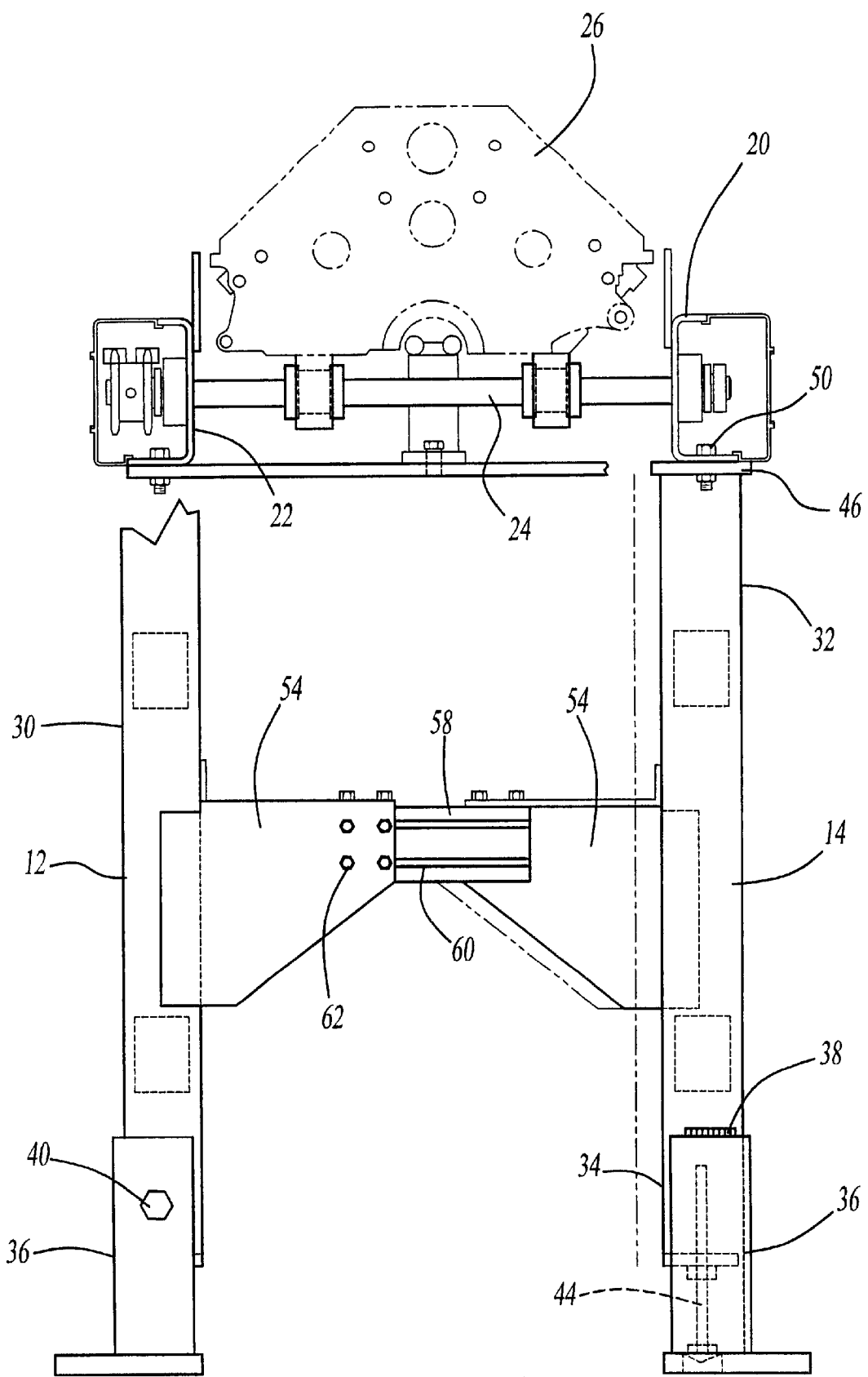
FIG. 1 is an end view illustrating a preferred embodiment of the present invention.
Figure 2:
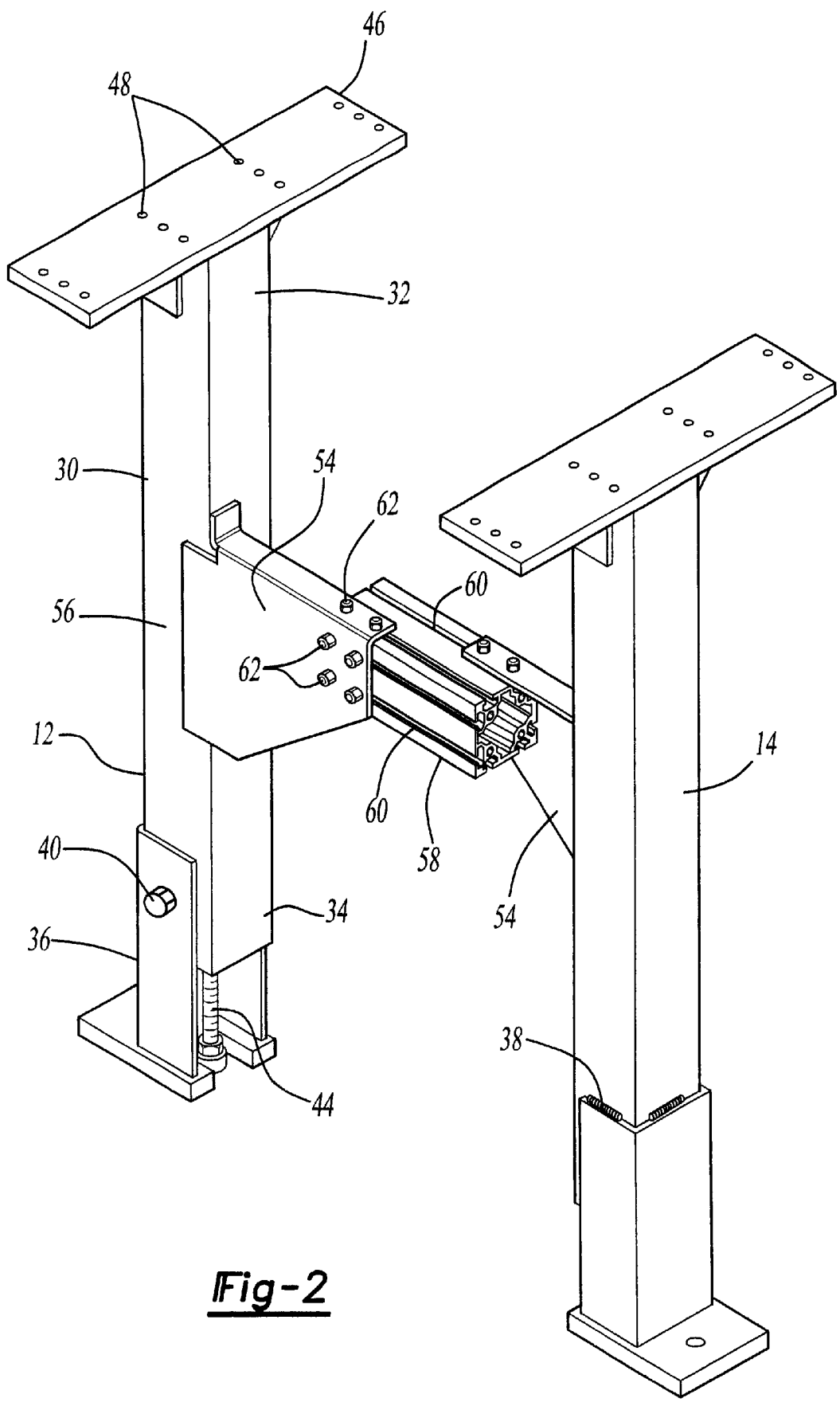
FIG. 2 is an elevational view illustrating a portion of the preferred embodiment of the present invention.

With reference now to FIGS. 1 and 2, the first pair of vertical supports 12 and 14 are there shown in greater detail. The first pair of vertical supports 12 and 14, moreover, are substantially identical to the second pair of vertical supports 16 and 18. Consequently, only the first pair of vertical supports 12 and 14 will be described in detail, it being understood that a like description shall also apply to the second pair of vertical supports 16 and 18.

The vertical supports 12 and 14 are each substantially identical to each other and comprise an elongated square tube 30 having an upper end 32 and a lower end 34. A foot 36 is secured to the lower end 34 of the tube 30 by any conventional means, such as by welds 38 or alternatively by fasteners 40. The foot 36 is adapted to rest upon a ground support surface and thus support both the vertical support 12 and 14 as well as the rails 20 and 22.

As best shown in FIG. 2, the vertical support 12 preferably includes a threaded shaft 44 to vary the vertical position of the square tube 30 relative to the foot 36 prior to securing the foot 36 to the square tube 30. The height adjustment provided by the threaded shaft 44, however, is purely optional.

A bracket 46 is secured to the upper end 32 of the tube 30. This bracket 46 includes a number of mounting holes 48 which are adapted to register with like mounting holes in the rails 20 and 22. Threaded fasteners 50 (FIG. 1) are then used to secure the rails 20 and 22 to the upright supports 14 and 12, respectively.

Still referring to FIGS. 1 and 2, a side bracket 54 is secured to and extends laterally outwardly from each tube 30. Preferably, these side brackets 54 are secured to their associated tubes 30 by welding. Furthermore, as best shown in FIG. 2, the side brackets 54 lie in a plane that is offset from a center line of the tubes 30 such that each bracket 54 is aligned with one side 56 of its associated tube 30.

An elongated channel member 58 having at least one and preferably a plurality of longitudinally extending slots 60 is disposed between the side brackets 54 on the vertical supports 12 and 14. One or more fasteners 62, e.g. T bolts, extend through registering openings in the side bracket 54 so that one end of each fastener 62 is slidably positioned within one slot 60 on the channel member 58.

Since the fasteners 62 are slidably positioned within one slot 60 on the channel member 58, the spacing between the vertical supports 12 and 14 may be varied to any user selected spacing between the vertical supports 12 and 14 as illustrated in phantom line in FIG. 1. Upon tightening of the fasteners 62, however, the side brackets 62 are rigidly secured to the channel member 58 and thus rigidly secured to each other. However, at a subsequent time, the spacing between the vertical supports 12 and 14 may be adjusted by loosening the fastener 62, repositioning the vertical supports 12 and 14, and then subsequently retightening the fasteners 62.

As best shown in FIG. 2, the channel member 58 preferably has the same width as the width of the tubes 30 on the vertical supports 12 and 14. Thus, since the side brackets 54 are aligned with one side 56 of the tube 30, upon tightening of the side brackets 54 to opposite sides of the channel member 58, any skewing of the vertical supports 12 and 14 relative to each other is avoided.

Alternatively, for a very narrow width conveyor, the brackets 54 may be secured together without an intervening channel member.

In order to ensure modular construction of the vertical supports 12 and 14 as well as the rails 20 and 22, the rails 20 and 22, as well as the support brackets 46, are preferably formed by laser cutting. Such laser cutting ensures that the fastener openings in the support brackets 46 will register with the corresponding fastener openings in the rails 20 and 22.

Figure 3:
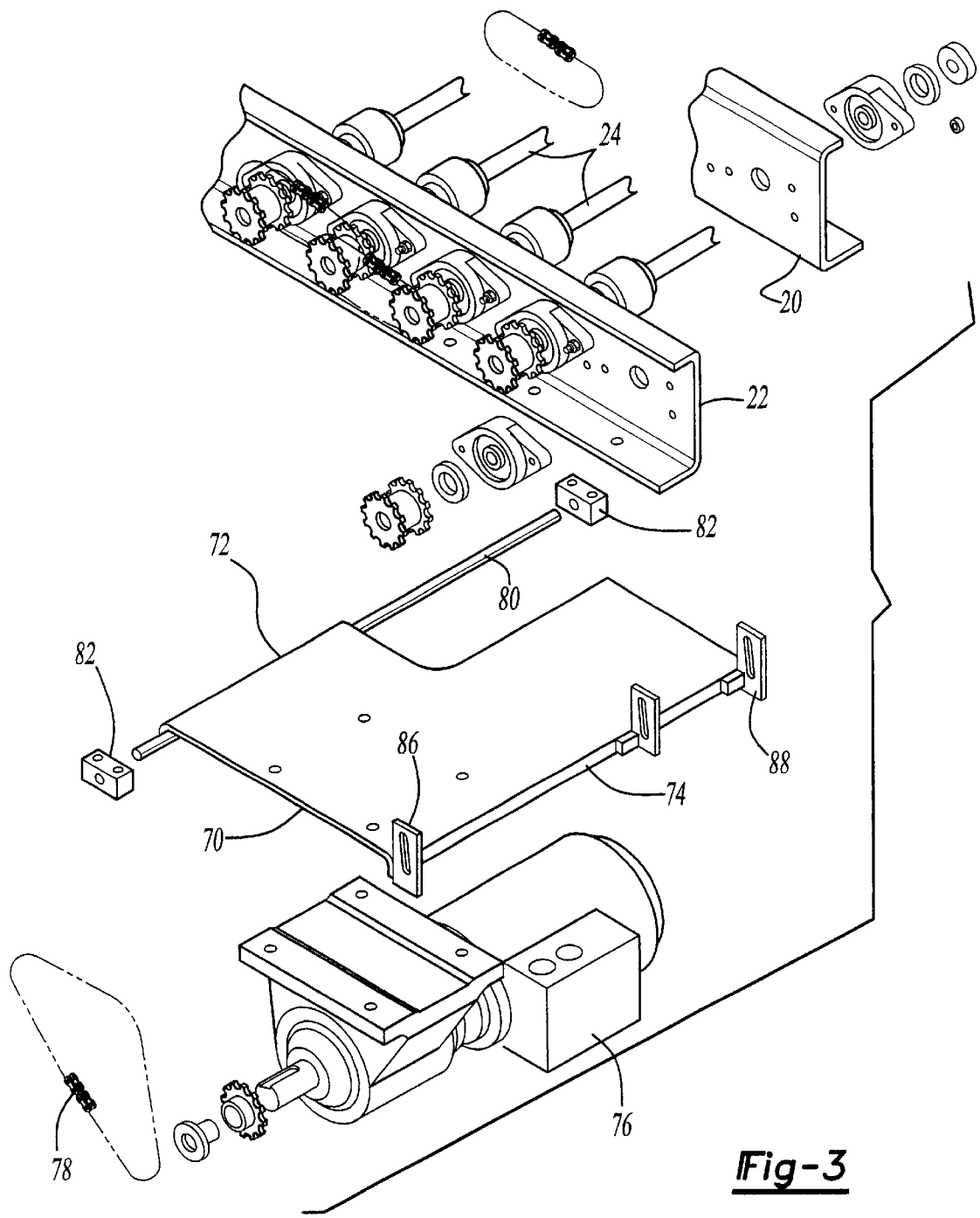
FIG. 3 is a fragmentary exploded view illustrating a portion of the preferred embodiment of the present invention.

With reference now to FIG. 3, in order to rotatably drive the roller assemblies 24, a generally L-shaped motor mounting plate 70 having a short side 72 and a long side 74 is mounted to and beneath the rails 20 and 22. A rotary drive motor 76 is secured to the motor mount plate 70 and is drivingly connected to the roller assemblies 24 in any conventional fashion, such as by a drive chain 78.

In order to secure the motor mount plate 70 to the rails 20 and 22, an elongated rod 80 extends through and is supported by blocks 82 which are secured to the rails 20 and 22. This rod 80, furthermore, supports the short side 72 of the motor mount plate 70.

In order to support the long side 74 of the motor mount plate 70 to the rails 20 and 22, a first bracket 86 is secured to one end of the side 74 of the motor mount plate 70 while a second bracket 88 is adjustably secured in any conventional fashion to the side 74 of the motor mount plate 70 at a position spaced from the first bracket 86. These brackets 86 and 88 register with openings in the rails 20 and 22 in order to secure the side 74 of the motor mount plate 70 to the rails 20 and 22.

The attachment of the motor mount plate 70 by the rod 80, which may be of adjustable length to accommodate varying widths between the conveyor rails 20 and 22, as well as the adjustable bracket 88, enables the same motor mount plate 70 to be utilized with the conveyor system regardless of the spacing between the rails 20 and 22.

From the foregoing, it can be seen that the present invention provides a modular roller conveyor system in which the width between the rails which support the roller assemblies may be easily adjusted to any user selected spacing to accommodate articles of different widths. Furthermore, the spacing between the conveyor rails 20 and 22 may be varied at a subsequent time to accommodate a different load having a different width.

Having described my invention, however, many modifications thereto will become apparent to those skilled in the art to which it pertains without deviation from the spirit of the invention as defined by the scope of the appended claims.

We claim:

1. A modular roller conveyor system comprising:
   a first pair of elongated vertical supports, each of said first pair of elongated vertical supports being substantially identical to the other,
   means for adjustably securing said first pair of vertical supports together so that said first pair of vertical supports are spaced apart and parallel to each other at a user selected variable spacing between said first pair of vertical supports,
   a second pair of elongated vertical supports, each of said second pair of elongated vertical supports being substantially identical to the other,
   means for adjustably securing said second pair of vertical supports together so that said second pair of vertical supports are spaced apart and parallel to each other at said user selected variable spacing between said second pair of vertical supports, a first and second elongated rail, said first rail being secured to an upper end of one of said first pair of vertical supports and an upper end of one of said second pair of vertical supports, said second rail being secured to an upper end of the other of said first pair of vertical supports and an upper end of the other of said second pair of vertical supports so that said rails are spaced apart and parallel to each other, and a plurality of spaced apart roller assemblies disposed between and supported by said rails;

wherein said means for securing said first pair of vertical supports together comprises an elongated channel member having at least one longitudinally extending slot extending continuously from a first end of said channel member to a second end of said channel member a first fastener secured to one of said first pair of vertical supports and extending through said slot, and a second fastener secured to the other of said first pair of vertical supports and extending through said slot both said first and second fasteners being slidable along said slot prior to tightening.

2. The invention as described in claim 1 wherein said means for securing said second pair of vertical supports together comprises a second elongated channel member having at least one longitudinally extending slot, a third fastener secured to one of said second pair of vertical supports and extending through said second channel member slot, and a fourth fastener secured to the other of said second pair of vertical supports and extending through said second channel member slot.

3. The invention as described in claim 1 and comprising a motor mount plate, means for mounting said motor mount plate to said rails, a motor secured to and supported by said plate and means for drivingly connecting said motor to at least one roller assembly.

4. The invention as described in claim 3 wherein said motor plate is L-shaped thus having a short side and a long side, and said motor mount plate mounting means further comprises a rod having opposite ends secured to said rails and supporting said motor mount plate along a midsection of said rod.

5. The invention as described in claim 1 wherein said means for securing said first pair of vertical supports together further comprises a side bracket secured to and extending laterally outwardly from each vertical support, said channel member being secured between said side brackets.

6. The invention as described in claim 5 wherein each vertical support comprises a square tube and wherein said bracket is substantially coplanar with one side of said tube.

* * * * *